(12) United States Patent
Church et al.

(10) Patent No.: US 10,038,659 B2
(45) Date of Patent: *Jul. 31, 2018

(54) ELECTRONIC BUSINESS POSTAL SYSTEM

(71) Applicant: Escher Group (IRL) Limited, Dublin (IE)

(72) Inventors: Liam Church, Dublin (IE); Fionnuala Higgins, Dublin (IE); David James Fleming, Wicklow Town (IE)

(73) Assignee: ESCHER GROUP (IRL) LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,310

(22) Filed: Oct. 6, 2016

(65) Prior Publication Data

US 2017/0026325 A1    Jan. 26, 2017

Related U.S. Application Data

(63) Continuation of application No. 14/299,524, filed on Jun. 9, 2014, now Pat. No. 9,477,948, which is a (Continued)

(51) Int. Cl.
*G06F 15/16* (2006.01)
*H04L 12/58* (2006.01)
(Continued)

(52) U.S. Cl.
CPC .......... *H04L 51/12* (2013.01); *G06Q 10/107* (2013.01); *G06Q 50/32* (2013.01); *H04L 63/08* (2013.01); *H04L 63/123* (2013.01)

(58) Field of Classification Search
CPC .. C08K 3/32; C08K 9/10; C08L 23/02; C08L 5/08; C08L 5/14; G06Q 10/107;
(Continued)

(56) References Cited

U.S. PATENT DOCUMENTS 6,182,219 B1   1/2001  Feldbau et al.
6,285,777 B2   9/2001  Kanevsky et al.
(Continued)

FOREIGN PATENT DOCUMENTS

WO   WO 2007/073943   7/2007
WO   WO 2008/0865346  6/2008

OTHER PUBLICATIONS

Charter of Consumer Rights in the Digital World, Doc No. INFOSOC 37-38, Trans Atlantic Consumer Dialogue (TACD), issued Mar. 2008.

*Primary Examiner* — Zarni Maung
(74) *Attorney, Agent, or Firm* — Cesari & McKenna, LLP; Omar M. Wadhwa

(57) ABSTRACT

An electronic business postal system collects, clears and delivers electronic business mail through a closed access, secure messaging system. A collection subsystem consists of access portals that are associated with secured system nodes. The access portals provide authenticated users access to the system to send and retrieve electronic business mail that includes postal system electronic delivery addresses, physical delivery addresses, or both. Secured message servers that are associated with the respective access portals process the electronic business mail into uniquely identified messages for delivery over the system nodes and also process received messages to provide the corresponding electronic business mail to the intended recipients through associated access portals. A delivery subsystem directs the messages through the system nodes associated with the senders' access portals to the system nodes associated with the recipients' access portals. A clearance subsystem confirms the integrity of both the messages and their delivery and ensures that each message is delivered once and intact.

20 Claims, 9 Drawing Sheets

Related U.S. Application Data continuation of application No. 13/971,386, filed on Aug. 20, 2013, now Pat. No. 9,406,050, which is a continuation of application No. 12/569,465, filed on Sep. 29, 2009, now Pat. No. 8,600,912.

(60) Provisional application No. 61/101,200, filed on Sep. 30, 2008.

(51) Int. Cl.
*G06Q 10/10* (2012.01)
*G06Q 50/32* (2012.01)
*H04L 29/06* (2006.01)
*G06F 12/00* (2006.01)

(58) Field of Classification Search
CPC ......... G06Q 50/32; H04L 51/12; H04L 63/08; H04L 63/123
See application file for complete search history.

(56) References Cited

U.S. PATENT DOCUMENTS

| | | | |
|---|---|---|---|
| 6,473,407 B1 | 10/2002 | Ditmer et al. | |
| 6,571,344 B1 | 5/2003 | Sitnik | |
| 7,240,199 B2 | 7/2007 | Tomkow | |
| 8,600,912 B2* | 12/2013 | Church | G06Q 10/107 705/338 |
| 9,406,050 B2* | 8/2016 | Church | G06Q 10/107 |
| 9,477,948 B2* | 10/2016 | Church | G06Q 10/107 |
| 2002/0065828 A1* | 5/2002 | Goodspeed | G06F 17/30887 |
| 2002/0116508 A1 | 8/2002 | Khan et al. | |
| 2003/0172145 A1* | 9/2003 | Nguyen | G06Q 10/10 709/223 |
| 2003/0208442 A1 | 11/2003 | Cockrill | |
| 2004/0044734 A1 | 3/2004 | Beck | |
| 2004/0117451 A1* | 6/2004 | Chung | H04L 29/06 709/207 |
| 2004/0151323 A1 | 8/2004 | Olkin et al. | |
| 2005/0102526 A1 | 5/2005 | Davey et al. | |
| 2007/0005717 A1 | 1/2007 | Levasseur et al. | |
| 2008/0221913 A1 | 9/2008 | Cook | |
| 2008/0320092 A1 | 12/2008 | Campbell | |
| 2009/0089185 A1 | 4/2009 | Noures | |
| 2009/0138730 A1 | 5/2009 | Cook | |
| 2010/0082981 A1 | 4/2010 | Church | |
| 2010/0281125 A1 | 11/2010 | Virtanen | |
| 2013/0339463 A1 | 12/2013 | Church | |

\* cited by examiner

Sender/Recipient Address ⟹ Sender/Recipient Id

From　　　　To　　　　　　utilco9182　　　jhnctzn54g27x3950
Utility　　　John
Company　　Citizen　　　　Country
Industrial　　15, Main　　　　IE
Park　　　　Street
Busy Town　River　　　　　Language
Ireland　　　Village　　　　　EN
　　　　　　Ireland

Correspondence Content ⟹ Content Data

Dear Customer　　　　　　ACCNO: 54273950　　AMT: 85.92
Utility Company
has recently　　　　　　　INVOICE: 002673/08
reviewed your
Account and　　　　　　　OTHERCUSTOMERDATA:
related charges . . .

In relation to our
Invoice No., please
find below . . .

*FIG. 3C*

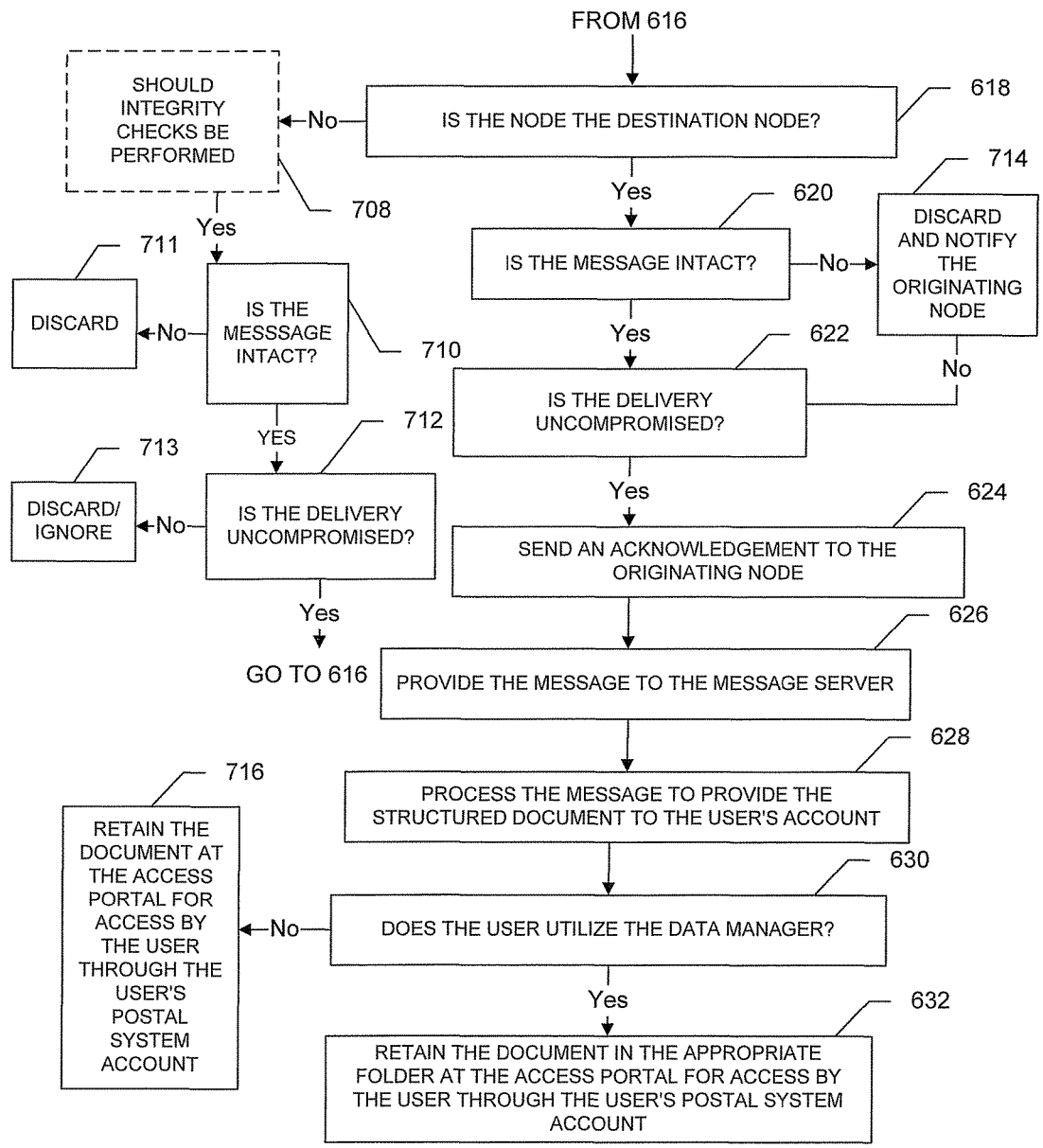
*FIG. 6 con't*

ELECTRONIC BUSINESS POSTAL SYSTEM

CROSS-REFERENCE TO RELATED APPLICATIONS

The present application is a continuation of commonly assigned copending U.S. patent application Ser. No. 14/299,524, which was filed on Jun. 9, 2014, which is a continuation of commonly assigned U.S. patent application Ser. No. 13/971,386, which was filed on Aug. 20, 2013, by Liam Church et al. for a ELECTRONIC BUSINESS POSTAL SYSTEM, now U.S. Pat. No. 9,406,050 issued on Aug. 2, 2016, which is a continuation of commonly assigned U.S. patent application Ser. No. 12/569,465, which was filed on Sep. 29, 2009, by Liam Church et al. for a ELECTRONIC BUSINESS POSTAL SYSTEM, now U.S. Pat. No. 8,600,912 issued on Dec. 3, 2013, which claims priority from U.S. Provisional Patent Application Ser. No. 61/101,200, which was filed on Sep. 30, 2008, by Liam Church et al. for an ELECTRONIC BUSINESS POSTAL SYSTEM; all of which are hereby incorporated by reference.

BACKGROUND OF THE INVENTION

Field of the Invention

The invention relates generally to postal delivery systems and, more particularly, to postal delivery systems that provide electronic delivery of business documents.

Background Information

In the course of everyday business, parties enter into contracts and supply and receive goods and services on the basis of these contracts. The parties to these contracts need to be certain of their rights and obligations within the contract and the parties may wish to record activity under the contract so that each party is clear on the status of the contract. In addition, each party may wish to rely on the recorded activity in the event of a dispute between the parties. For these and other reasons, contracts are often committed to paper and a copy is provided to each party. Also, for these reasons, a concise record of activities within the contract is often committed to paper and a copy is provided to each party to the contract. This activity paper is often called "Transactional Paper" and is often viewed as a formal record of the date and time that a contractual event has happened.

This method of recording and creating a copy is balanced in favor of all parties to the contract and each party can refer to a complete record of activities in the event of a dispute. In the case where the parties to the contract are adjacent at the time of the event, a copy of the paper record is transferred by hand between the parties. In the case where the parties are not adjacent at the time of the event, a copy of the paper record may be is placed into an envelope, addressed and delivered over a "Postal Network." When transactional paper is sent through the Postal Network it is often called transactional mail or business mail.

For transactional mail, the Postal Network is often seen as an efficient way to communicate a large volume of business documents between a large number of addresses in a secure manner. It consists of a known number of collection points, which may be located close to the entities or natural persons that generate the transactional mail, and a known number of delivery points at which the legal entities or natural persons are located.

It is this combination of concise transactional recording of contractual events, i.e., the creation of copies for each party and an efficient and universally available secure distribution system connecting contractual parties, that makes transactional mail a globally acceptable means of communicating for business. It is equally available to all and allows all parties to operate independently and in a disconnected manner.

Postal systems within the Postal Network perform the functions of collecting mail pieces from, for example, dedicated post boxes, business premises, post office windows, and so forth, routing the mail pieces to postal system sorting centers and distributing the mail to recipient mail boxes, businesses, and so forth. The mail pieces of interest are business and transactional correspondence, such as letters, invoices, account statements, contracts, and so forth. These mail pieces are paper that must be handled at collection, routing and sorting, and distribution operations, adding considerably to the overall cost of the mailing. Another important consideration is the environmental impact of so much paper.

Certain businesses, such as banks, utilities and so forth, may provide user account information on-line for viewing by the user. The user must request access to the information separately from each of the respective businesses and, once permission is granted by a given business, the user is permitted access to information that remains solely under the control of the given business. This business-controlled access method may be anticompetitive by not delivering data to the user for independent access and use, and/or by combining relevant transaction information with other data such as information about services offered by that business or related business, and so forth, to obscure access, or by providing data in inconsistent forms, and thus, preventing the user from accessing and moving the data out of the control of the business.

Further, the businesses may provide certain information to the users by email, though firewalls and other email system constraints affecting, for example, attachments, may disrupt the communication in a manner that is not discernable by the sender or the intended receiver. In addition, adequate security for such email communications is often lacking, such that it is not advisable to send sensitive information in this manner. Also, email is a person to person form of communication and is thus not particularly well suited for communication with a legal entity in a manner that is consistent with the recording of a business transaction. Further, it is not easy for businesses to distinguish, within their email systems, between contractual communications with customers and personal communications with customers.

For these and other reasons, the business and transactional correspondence are not generally handled electronically. Indeed, even when electronic communications are utilized during a transaction, paper confirmation copies are exchanged via the Postal Network as the transaction record.

SUMMARY OF THE INVENTION

An electronic business postal system performs collection, clearance and delivery of electronic business mail through a closed access, secure messaging system. The system includes a collection subsystem that consists of access portals that are associated with secured system nodes. The access portals provide authenticated users access to the system to send and retrieve electronic business mail that includes postal system electronic delivery addresses, physical delivery addresses, or both. One or more messaging subsystems, which consist of secured message servers that are associated with the access portals, process the electronic business mail into uniquely identified messages for delivery over the system nodes and also process received messages to provide the corresponding electronic business mail to the intended recipients through associated access portals.

A delivery subsystem directs the messages through the system from the system nodes associated with the senders' access portals to the system nodes associated with the recipients' access portals. The delivery subsystem includes one or more address registries that associate the postal system electronic delivery addresses, physical delivery addresses, or both, with the system nodes and, in turn, access portals. The clearance subsystem operating at the system nodes confirms the integrity of both the messages and their delivery and ensures that each message is delivered once and intact to the access portal associated with the electronic delivery address.

The system nodes may be grouped into one or more of global regions, local regions and associated individuals. The one or more address registries then associate the electronic and/or physical delivery addresses with nodes in the groups, as appropriate for efficient delivery of the messages, and thus, the electronic business mailings, over the system.

To uniquely identify the messages, the system uniquely identifies the system nodes and uses the node identifiers to also identify the messages originated by the respective nodes. The system may further include in the message identifiers a monotonically increasing sequence number or other order indicator, which the clearance subsystem may uses to ensure that a given message is delivered always and only once. The system may further encode the messages using a cyclic redundancy check code and the like, such that the clearance subsystem can detect and discard any messages that have been altered.

BRIEF DESCRIPTION OF THE DRAWINGS

The invention description below refers to the accompanying drawings, of which:

FIGS. 3B-C illustrates structured documents that are utilized by the system of FIGS. 1 and 2;

DETAILED DESCRIPTION OF AN ILLUSTRATIVE EMBODIMENT

Figure 1:
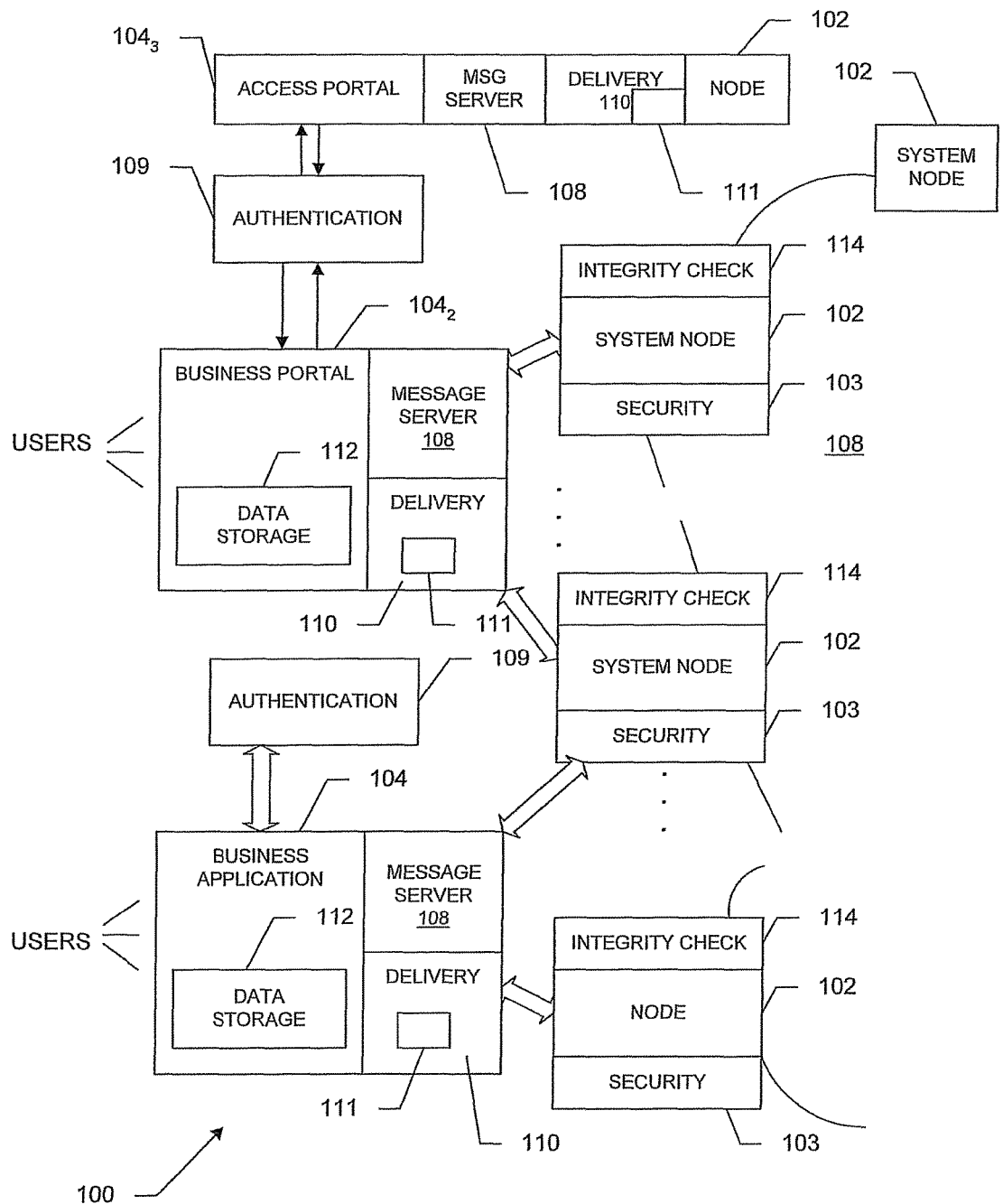
FIG. 1 is a functional block diagram of a system constructed in accordance with the invention.

Referring to FIG. 1, an electronic business postal system includes a closed access network 100 of secured system nodes 102 and a collection subsystem that consists of access portals 104 that are associated with the system nodes. The access portals, which may be business applications 104$_1$, business portals 104$_2$, or mobile devices 104$_3$ that contain secured system nodes, are the only access points to the network. The access portals allow authenticated users to send and retrieve properly addressed electronic business and transactional documents and correspondence over the system. The properly addressed electronic business documents and correspondence may be contracts, invoices, payment authorizations, letters, and so forth, and are referred to hereinafter as "electronic business mailings."

One or more messaging subsystems consist of one or more secured message servers 108 that are associated with the access portals 104. The message servers process the electronic business mailings to produce messages that are uniquely identified across the network 100. A delivery subsystem 110 routes the respective messages over the system nodes 102, from the originating system nodes associated with the senders' access portals to the destination system nodes associated with the access portals through which the recipients gain access to the system to, for example, retrieve the electronic business mailings. The delivery subsystem utilizes one or more address registries 111 that associate postal system electronic delivery addresses, physical delivery addresses, or both, with the system nodes and, as appropriate, with particular associated access portals if a given system node is associated with more than one access portal.

A clearance subsystem 114 operates at the system nodes 102 to check the integrity of the messages and also the delivery of the messages, to ensure that each message, and thus, the corresponding electronic business mailing, is delivered, delivered intact, and delivered only once. The various subsystems are discussed in more detail below.

The respective message servers 108 and system nodes 102 include security processes 103 that operate in a known manner to ensure that the servers and nodes utilize only authorized processes to produce the messages at the senders' access portals, route the messages, and provide the electronic business mailings to the recipients' access portals. In this way, interlopers can not disrupt the operations of the secured nodes and/or insert unauthorized messages into the system or re-direct messages that are within the system. The system thus ensures that the electronic business mailings are handled in a manner that satisfies the collection, clearance and distribution requirements of national and international postal service conventions and agreements, without requiring an exchange of paper. For ease of illustration, the security processes 103 are illustrated in the drawing as operating at the system nodes 102. However, the security processes operate also at the message servers 108.

Figure 2:
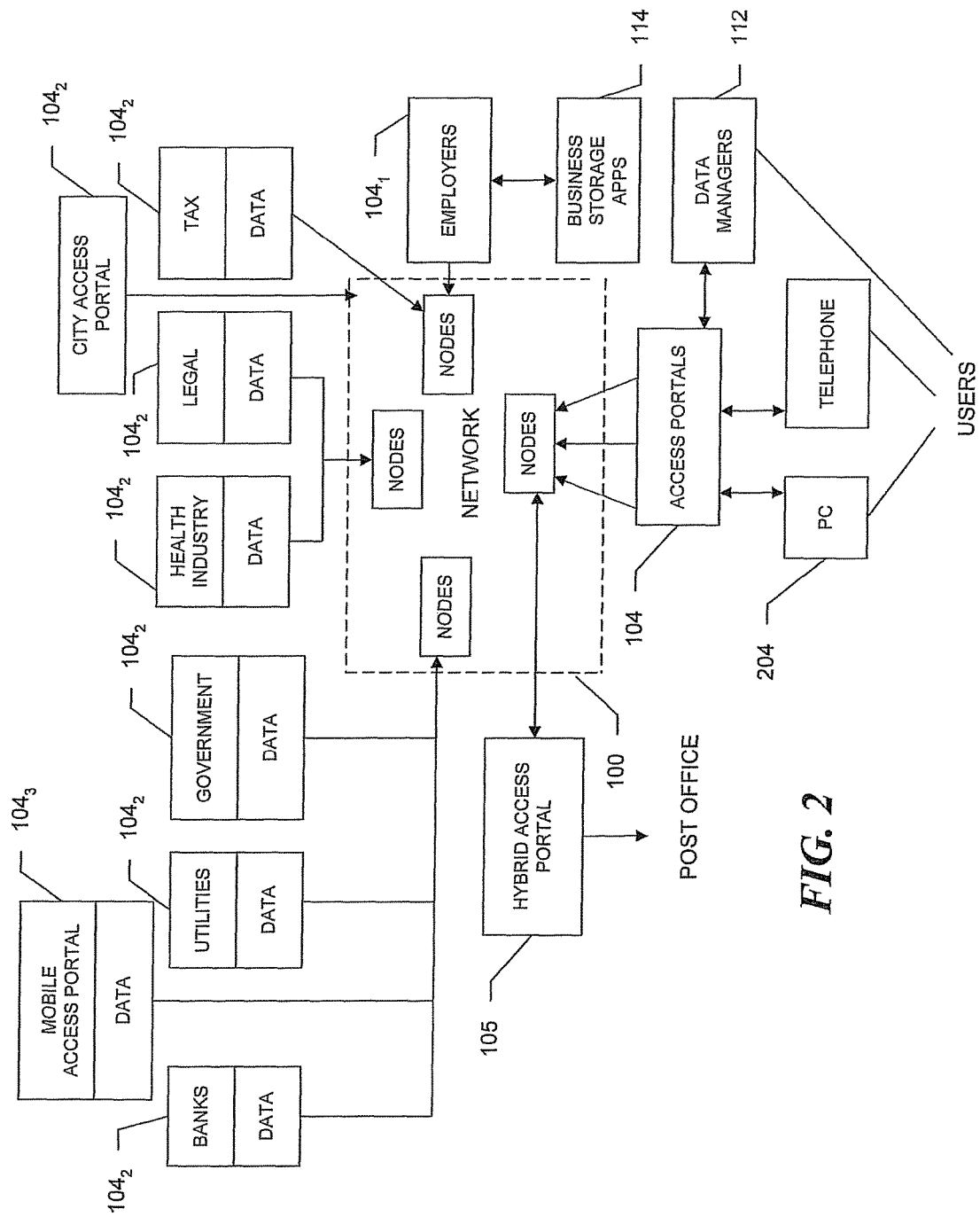
FIG. 2 is a functional block diagram that further illustrates the system of FIG. 1.

Referring also to FIG. 2, the access portals 104 are operated in conjunction with postal authorities or third-party hosts, such as banks or other companies, that provide authentication operations. The access portals may, for example, be established to service users in a particular geographic area, such as a city or state. Large entities or government agencies may also operate their own access portals for the sending and retrieving of the electronic business mailings provided by them to the system or directed to them over the system.

A user selects an appropriate access portal 104 and provides the necessary information for authentication to set up a postal system account with a postal system electronic delivery address. If a postal authority operates the access portals, the user selects the access portal that corresponds to his or her geographic area. If third parties host some or all of the access portals, the user may, as an example, select an access portal operated by a national bank or by another type of third party host, such as Google. Once the user's postal system account is established, the user may connect to the selected access portal over the telephone 202, through a television 204, a PC 206, or other electronic device, to send and retrieve electronic business mailings.

As discussed in more detail below, the system may also include one or more hybrid access portals 105, which receive electronic delivery of the electronic business mailings that have physical addresses but no corresponding postal system electronic delivery addresses are known. The hybrid access portals, which provide access to the system 100 for the Postal Network, allow the Postal Network to print out the business mail that corresponds to the electronic business mailings at post offices that are local to the respective physical delivery addresses. The post offices then deliver the business mail as paper mail pieces over established postal delivery routes in conformance with established postal service rules and regulations. To maintain the privacy of the communications, the post office may enclose the contents of the business mail in an envelope that reveals only the information required for delivery, i.e., the physical delivery address, franking information and, as appropriate, the sender's return address information. In addition, the hybrid access portals may be associated with other services that are entrusted to provide mail piece deliveries to physical delivery addresses.

Figure 6:
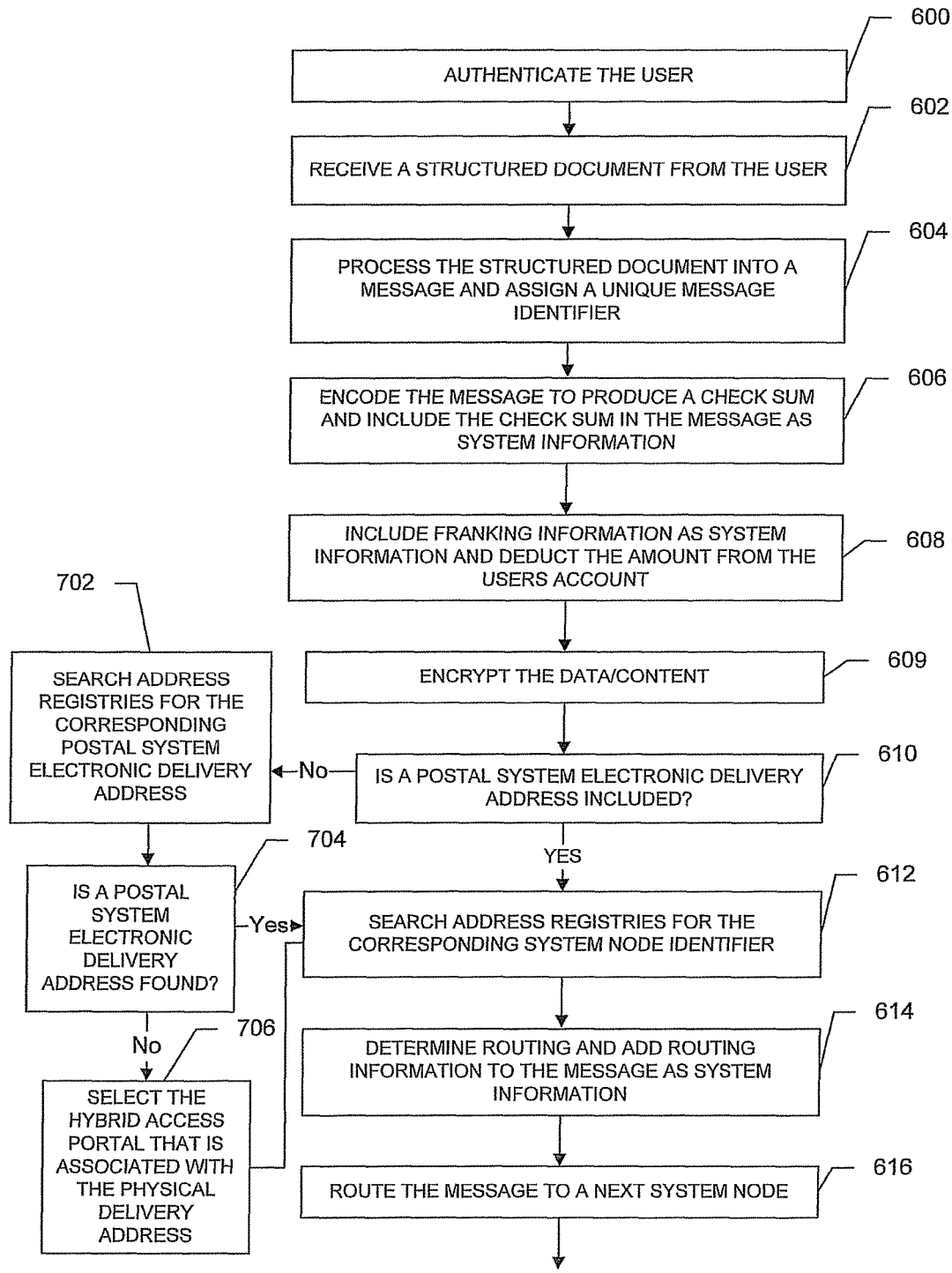
FIG. 6 is a flow chart of the document processing operations of the system of FIG. 1.

Referring again to FIG. 1 and also to FIG. 6, the access portals 104, in step 600, authenticate users and/or applications using authentication capabilities 109, which may be provided by the postal authority or third party host (not shown). The authentication capabilities operate in a known manner using, for example, combinations of user names and passwords and/or other identifying information, to penetrate associated layers of security. The user thus enters his user name and password through the access portal, and the authentication process, operating in a known manner, determines if the user name/password combination is valid. Once authenticated, a user has unlimited access through the access portal to provide electronic business mailings for delivery over the system (step 602) and/or retrieve electronic business mailings that have been directed through the system to the user's postal system electronic delivery address. In addition, the authenticated user has unlimited access to any user data that is being managed and retained by a data manager 112, which is a data management and storage service that may available through the access portal, as discussed in more detail below.

The one or more messaging subsystems, which are built utilizing messaging operations performed by Escher Group Limited's Riposte® software, operate together to uniquely identify the respective messages that are sent over the electronic business postal system 100. The messaging subsystems assign identifiers that are unique over the entire system 100 to the system nodes 102, and utilize the identifiers of the system nodes that originate the respective messages, that is, the nodes that are associated with the senders' access portals, to generate the unique identifiers for the messages. The message servers 108 may, for example, include all or a portion of the system node identifiers in the message identifiers, and/or may manipulate the system node identifiers to produce corresponding values that are then included in the message identifiers. In addition, the message servers may include in the message identifiers monotonically increasing sequence numbers and/or other order indicators such as date, time and so forth (step 604).

The message subsystems may further encode the messages to produce check sums, which are then used by the clearance subsystem to ensure that the messages are delivered intact. Thus, the message servers 108 use cyclic redundancy check codes or the like in a known manner to encode the messages, for example, byte-by-byte, to produce corresponding check sums. The check sums are then included in the messages, as part of the system information (step 606).

The message server 108 also includes as system information a franking code or other identification information that indicates how the cost of the communication is funded (step 608). The users will thus maintain deposit accounts within their postal system accounts or link their postal system accounts to banking accounts, and so forth, to fund the cost of delivering the electronic business mailings through the electronic business postal system.

The message server may also encrypt the body or content/data of the business mailings, using an encryption code in a known manner, to ensure the privacy of the information (step 609). The delivery address and system information are not encrypted, however, so that the information is available for message routing through the system nodes and to the associated message servers.

The delivery subsystem 110, in steps 610, 612 and 702, uses delivery address information from the business mailings to enter the address registries 111 and identify respective destination nodes that associated with the electronic and/or physical delivery addresses. In addition or alternatively, the delivery subsystem may identify a system node that is within a global or regional group of nodes that, in turn, will route the message to the destination node or to a node in another group of nodes, and so forth. The address registries may operate in known manners as data bases, look-up tables, ordered lists, and so forth.

If the delivery subsystem 110 cannot associate a physical delivery address with a corresponding user postal system electronic delivery address, the delivery subsystem, in steps 704 and 706, selects as the postal system electronic delivery address an appropriate hybrid mail access portal 105 (FIG. 2). The subsystem thus selects the hybrid access portal that is associated with a post office or other postal or carrier service that is local to and/or delivers to the physical delivery address. The address registries 111 then associate the selected postal system electronic delivery address with the appropriate destination node or group node, as described above.

Once the destination node or group node is identified for a given message, the delivery subsystem provides the necessary routing information to the message as system information and routes the message to the next system node (steps 614, 616, 618).

When a system node 102 receives a message, the node determines if the message is intact (steps 708, 710). Thus, the node encodes the received message to produce a new check sum and determines if the new check sum is the same as the check sum that is included in the received message. Other operations may be performed in addition to or as alternatives to the check sum operations, to ensure that the content of the received message is the same, e.g., byte-by-byte, as the message originated onto the network. The system node may also determine if the integrity of the message delivery is maintained, using the sequence number in the message identifier to determine, for example, that the message is the next message expected in the delivery sequence (step 712). Alternatively, the integrity checking of the message and/or the message delivery may be done at fewer than all of the system nodes or only at the destination and/or origination nodes, as discussed below.

If the system node 102 determines the message and, as appropriate, message delivery, pass the integrity checks, the node sends the message to a next system node along the route (step 618). Otherwise, the node discards the message (steps 711, 713). The discarding node may notify the originating node of the discard, and the originating node then re-sends the message. Alternatively, the originating node may re-send the message if an acknowledgement is not received within a predetermined time after the message is sent.

When the destination system node 102 receives the message, the node performs the integrity checks on the message and message delivery (steps 620, 622, 624). If the message fails either integrity check, the destination node discards the message and, as appropriate, notifies the originating node (step 714). If the message passes both integrity checks, the destination system node sends an acknowledgement of the receipt of the message to the originating system node, which then also confirms the integrity of the message delivery. In the example, the originating node checks that the message has not been received out of order. If the integrity of the delivery is compromised, the originating system node directs the destination node to discard the received message. The originating node then re-sends the original message. Otherwise, if the message and its delivery pass the integrity checks at both the designation node and the originating node, the message server 108 associated with the destination node strips the system information from the message, decrypts the message contents, as appropriate, and provides the corresponding electronic business mailing to the associated access portal 104 that is associated, also, with the intended recipient.

The message server 108 associated with the access portal 104 next, in step 626, processes the received message and provides the corresponding business mailing to access portal 104. The access portal then retains the business mailing for later retrieval by the intended recipient or, as appropriate, directs the business mailing to applications that require or manage the information (steps 628, 630, 716). For example, an access portal may direct an authorization for payment or an invoice into a given businesses accounting system based on the delivery address information or other information contained in the electronic business mailing, as discussed below.

Figure 5:
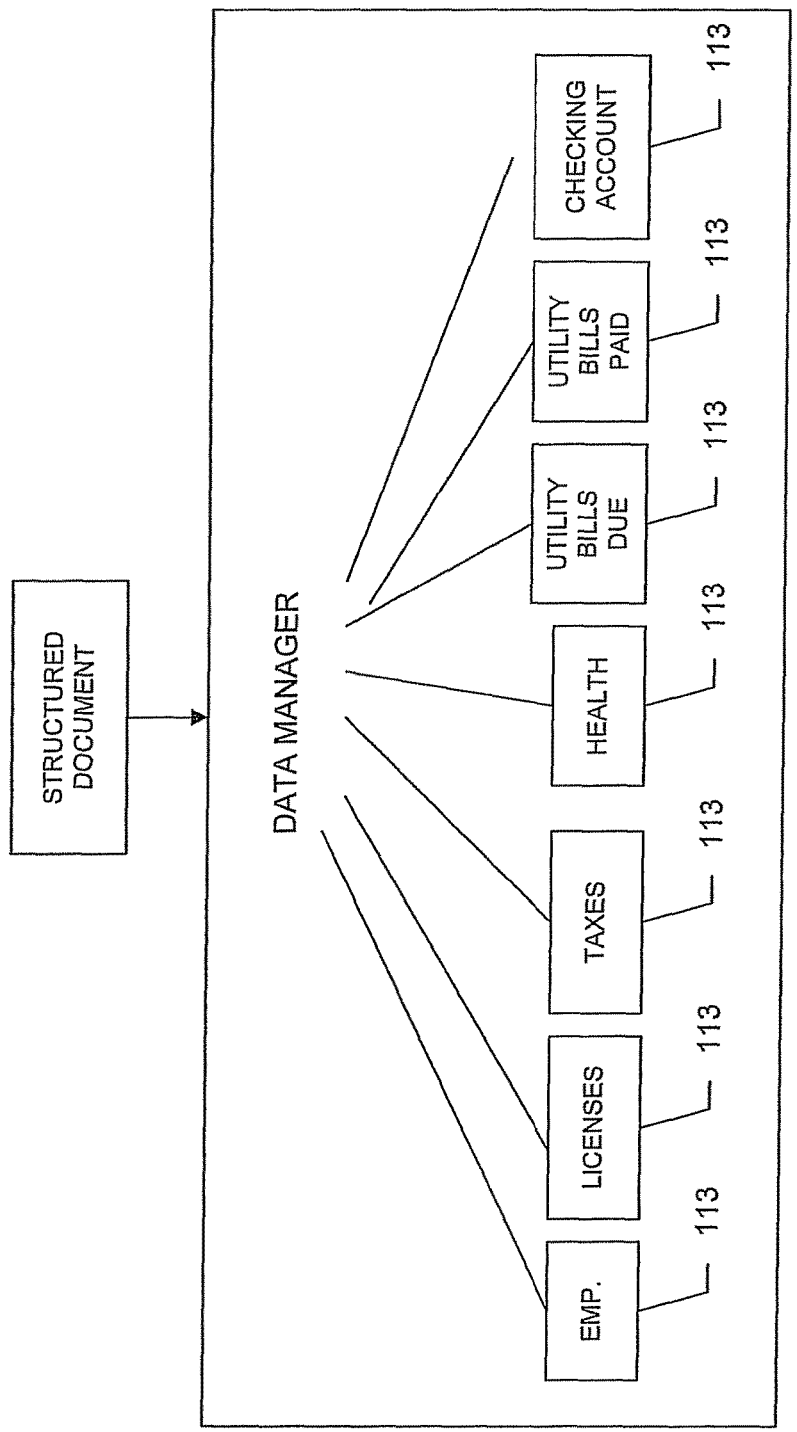
FIG. 5 is a functional block diagram of a data manager of FIG. 1.

In addition or in the alternative, the access portals 104 may operate a data manager 112 that provides data storage and management capabilities for the business mailings, or the content/data thereof, received and/or sent over the system, operating, for example, as an electronic filing system. Referring also to FIG. 5, the data manager may organize the data into electronic files 113 relating to taxes, licenses, employment, health, bills due, bills paid, checking account information, and so forth. Accordingly, a user may then store electronic tax records, health records, employment records, bills, invoices, payment information, prescription information, and so forth, from a multitude of sources in an organized and secure manner. Through the access portal, the user then has unlimited access to any or all of the information received over the system, and the user can, for example, further share the information as desired with others, such as an accountant or medical specialist, by sending the information in electronic business mailings over the system. The data storage and management operations are administered in a known manner, such as in the manner of customer relationship management (CRM) operations. The data manager may thus direct the electronic business mailings to particular files based the information contained in the electronic business mailing, such as the address information, the content/data, the type of document, i.e., invoice, payment authorization, the date, and so forth (steps 630, 632).

Figure 3A:
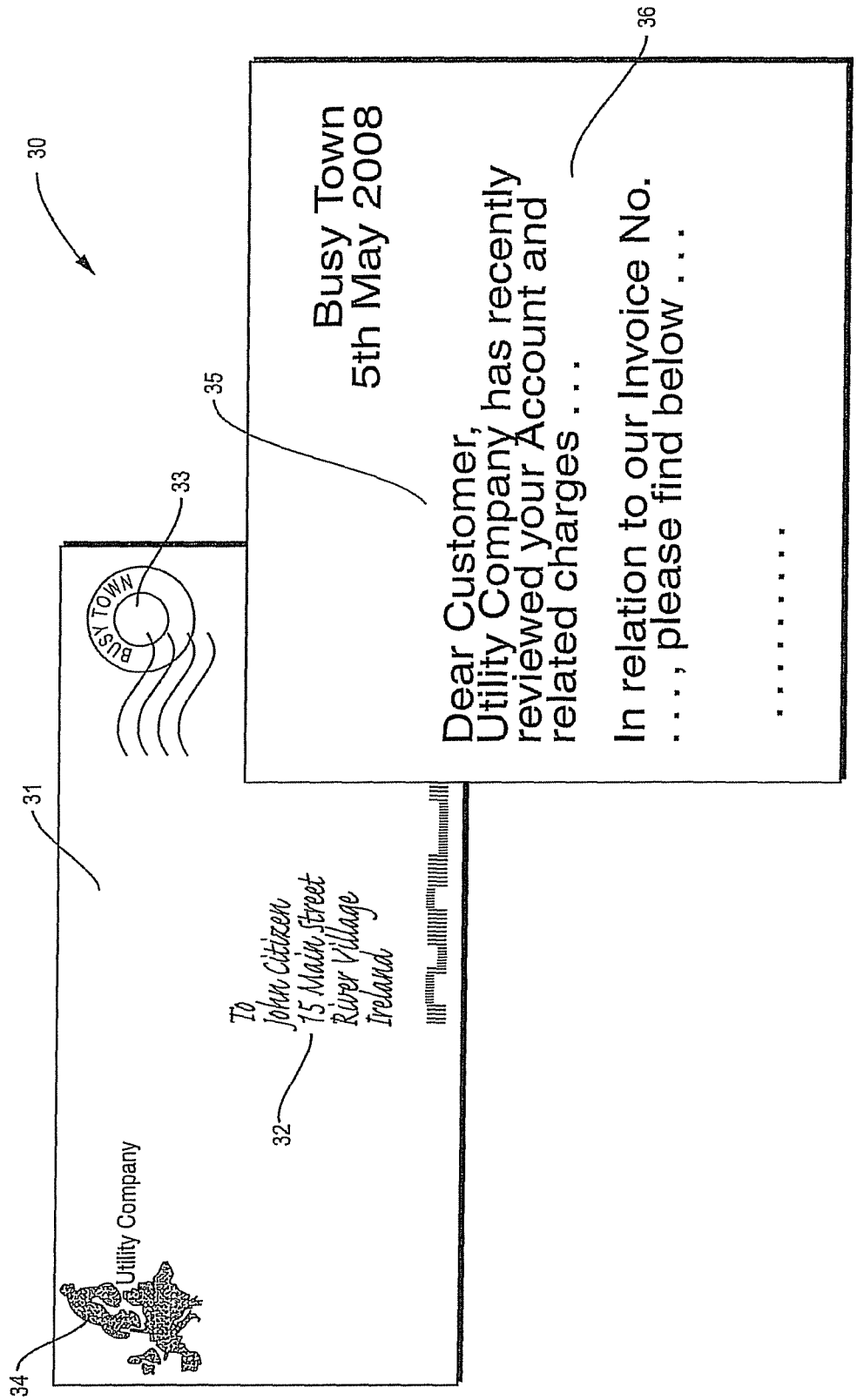
FIG. 3A illustrates the format of traditional business mail.
Figure 3B:
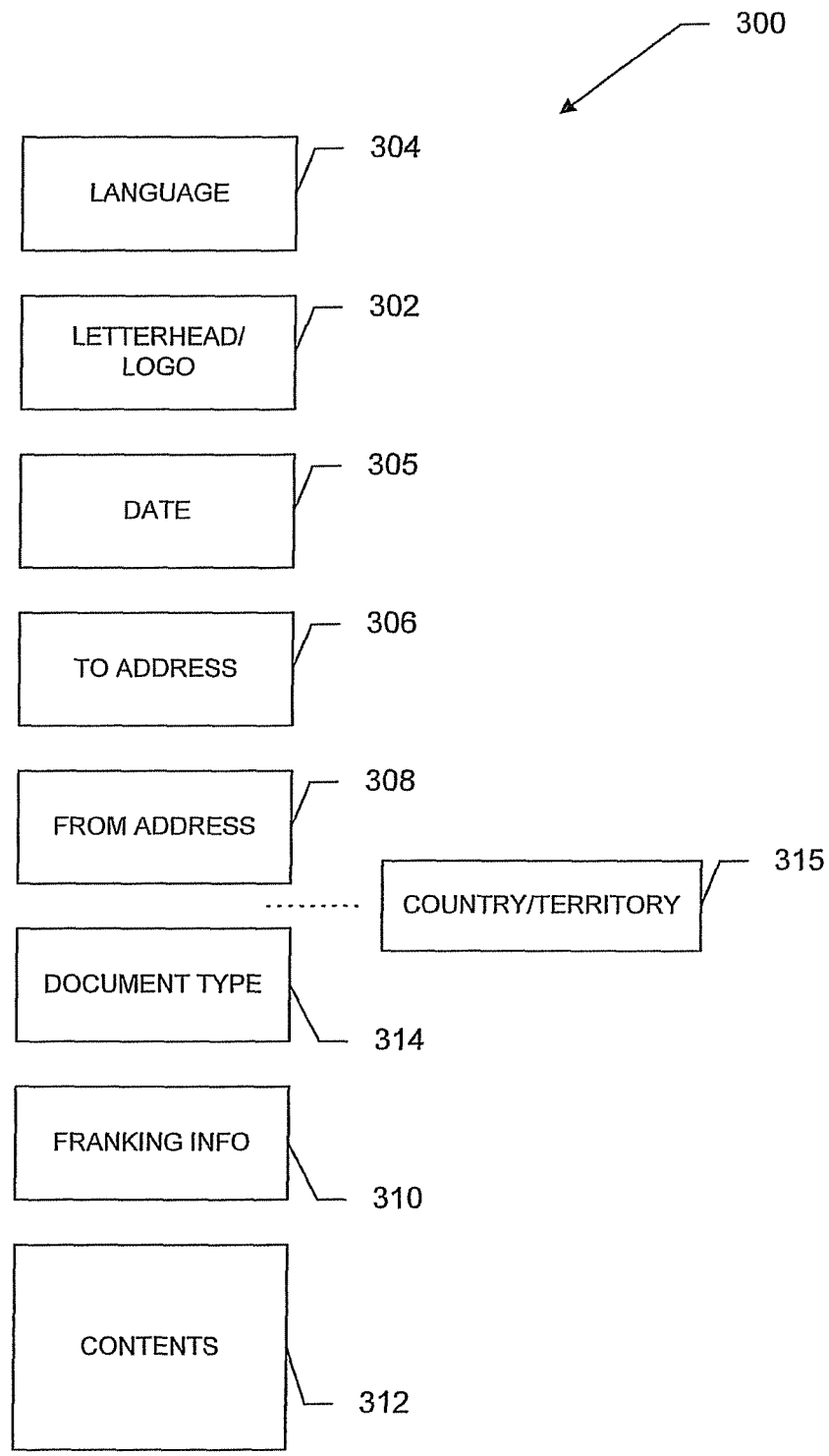

Referring now to FIGS. 3A-C, the electronic business mailings provided to the system are structured documents 300 (FIG. 3B) that are based on XML, such that the business mailings can be entered and interpreted through various operating systems. Traditional business mail 30, as illustrated in FIG. 3A, includes an envelope 31 with a recipient address 32, the sender's address or other return mail information 34, and franking information 33, which are read to route the correspondence through the traditional Postal Network. The envelope encloses correspondence or other documentation 35, and shields the contents/data 36 of the correspondence or documentation from the view of the Postal Network personal, to maintain the privacy of the content/data.

FIG. 3B illustrates an example of the structured form 300 utilized for electronic business mailings by the system 100. The structured form includes fields for letterhead or a company logo 302; a source language identifier 304 that allows the system to interpret messages in various languages; sender and recipient address information 306, 308; a date 305; system franking information 310; and contents/data 312. If the system operates internationally, space is provided also for country code 315. In addition, the structured form may include a message type field 314, to indicate a payment, an invoice, and so forth, which the recipient's and/or the sender's access portals may use to direct the electronic business mailing or the contents/data thereof to appropriate applications that require the data or to appropriate folders for managed retention through the data manager 112, as discussed above.

The recipient address information 308 may include a physical delivery address, such as a street address or postal box, and/or a postal system electronic delivery address, as discussed above.

FIG. 3C illustrates the fields that may be encrypted and those that remain unencrypted in the messages. As shown in the drawing, the system encrypts the content or data field 312, which corresponds to the content/data 36 of the conventional business mail illustrated in FIG. 3A. The address information 306, 308 and as appropriate 315 and the franking information 310, that is, the information that corresponds to the information 32-34 printed on a conventional envelope 30, remain unencrypted. Thus, the messages directed over the electronic business postal system 100 retain the privacy of the document content/data, as is done using conventional paper-based mail pieces, in conformance with is postal regulations and conventions.

The system 100 may communicate with alternative carriers that operate in additional countries or territories. The system thus transfers a message to an alternative carrier through an appropriate network connection, and in a manner that meets the requirements of applicable postal system national and international conventions and agreements that direct postal system operations for delivery of mail within the countries or territories.

As discussed above, the system may include hybrid access portals 105 (FIG. 2) that are utilized by the Postal Network or other carrier services to provide the electronic business mailings in paper form to local physical delivery addresses. By using the structured documents, the business mailings may be printed and enclosed in envelopes with strategically placed cutouts for the information from the address fields 306, 308 and 315, and/or the documents may be strategically formatted and folded or paginated, to maintain the privacy of the data contained in the content/data field 312.

Figure 4:
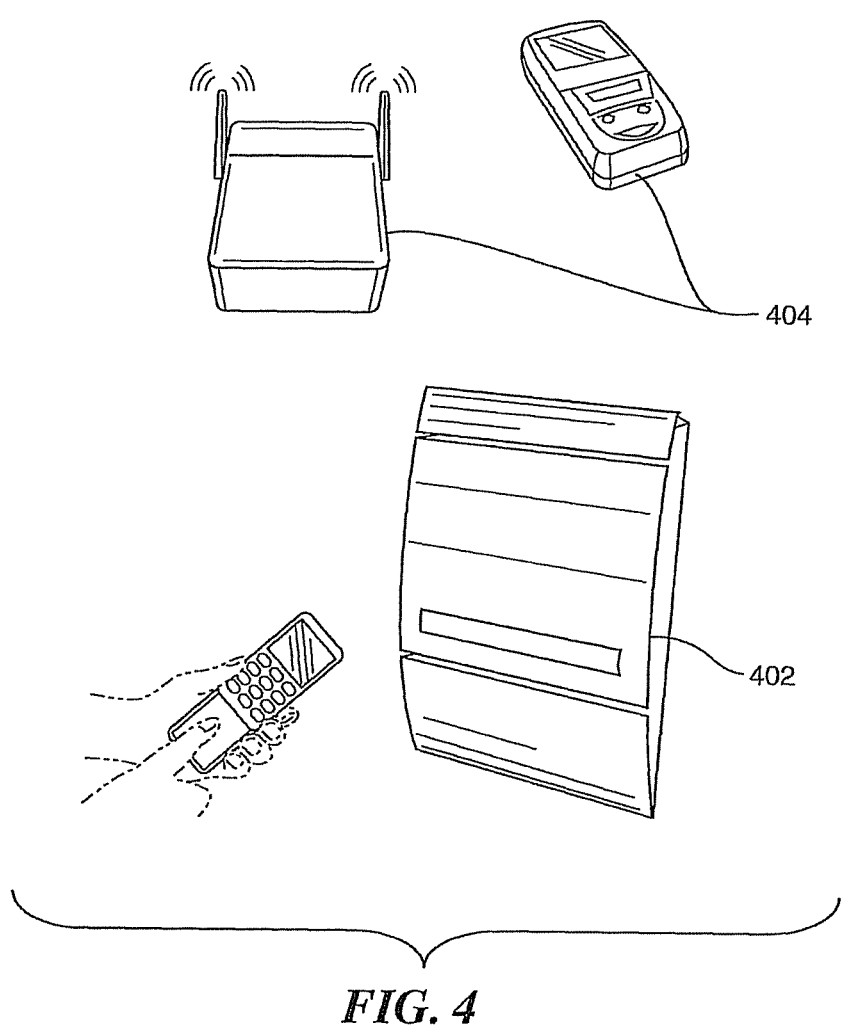
FIG. 4 illustrates alternative collection devices.

Referring to FIG. 4, the system may operate with many different types of secure collection and clearance devices, such as electronic mail boxes 402 or other transmission devices 404, that communicate with the access portals to authenticate the users and operate with included secured message servers and system nodes, to process the electronic business mailings into messages and route the messages over the system. The devices thus operate with the security capabilities 103 discussed above to ensure that the included message servers and nodes operate using the appropriate system processes and also that they can not be tampered with without detection.

The system 100 may group the system nodes 102 according to global regions, such as cites, states or countries, and/or local regions, such as towns, and/or associated individuals, such as selected company employees or departments. The system may, for example, group the system nodes in a manner that corresponds to Postal Network country codes and/or zip codes or territory codes, for efficient operation of the delivery subsystem and, in particular, the address registries 111. As discussed above, the delivery subsystem may direct messages to nodes within groups, which thereafter direct the messages to the destination nodes or nodes within other groups or subgroups thereof, and so forth.

The system may also include multiple delivery addresses for a given user, and allow the user to set preferences for a given delivery or a given time period, and so forth. The system may also allow the user to select different electronic and/or physical delivery addresses for different types of electronic business mailings, e.g., from particular senders or including particular content such as invoices, payment authorizations, and so forth. Alternatively or in addition, the system may allow the user to select different electronic and/or physical delivery addresses for vacation periods and so forth.

The electronic business postal system 100 provides users with all of the advantages of the paper-based Postal Network, and also provides the distinct advantages of not only eliminating the paper in traditional mail but also ensuring delivery of intact electronic business mailings, that is, ensuring that a business document is not lost enroute and yet assumed to be delivered, or the document is not partially or totally rendered unintelligible by improper handling by the Postal Network. In addition, the system 100 has distinct advantages over existing on-line services, provided, for example, by banks, that allow an authenticated user to view certain of their account while, at the same time, keeping all of the account information under the control of the bank. The system 100 instead provides the users with control over their information, similar to the control a user has over the information contained in paper statements of their accounts, yet without the need for paper and without sacrificing the security of the information. For example, the system 100 can maintain the user's account data over time, such that the user can read back through older data at any time. In addition, the user can send all or a portion of the data to others, such as his/her accountant, at any time in a secure manner by including the data in an electronic business mailing directed over the system.

As discussed above, the electronic business postal system 100 provides users equal access to send and retrieve electronic business mailings, in the same sense that the Postal Network provides equal access to users of paper-based business mail. Also, with the equal access and further based on the fact that users have unlimited access to the content of their electronic business mailings, and the electronic business mailings are structured documents that present content in a consistent form that can be entered and interpreted by various operating systems, the system 100 is a neutral system in the sense described by the Trans Atlantic Consumer Dialogue ("TACD") in the document entitled Charter of Consumer Rights in the Digital World, DOC No:IN-FOSOC 37-38, issued March 2008. Further, the system 100 satisfies many of the consumer rights set forth by the TACD that are not met by known prior systems.

The foregoing description has been limited to a specific embodiment of this invention. It will be apparent, however, that variations and modifications may be made to the invention, the clearance operations may be performed at some or all of the system nodes, selected system nodes may perform certain but not all of the clearance operations, processes and processors shown separately may be combined and the processes performed by a given processor may be performed by combinations of processors, the processes may be performed in hardware, software or firmware, or any combination thereof, certain processes may be performed in different orders, the system may be used to deliver electronic non-business mail that meets the requirements of the structured document and franking, with the attainment of some or all of its advantages. Therefore, it is the object of the appended claims to cover all such variations and modifications as come within the true spirit and scope of the invention.

What is claimed is:

1. An access portal of a secure system of nodes, the access portal comprising:
processing logic configured to:
receive one or more authentication input commands to authenticate a first user registered with the secure system of nodes;
receive, after the first user is authenticated, one or more first input commands to create a first electronic business mailing, wherein the first electronic business mailing is sent over the secure system of nodes to a destination access portal associated with a recipient of the first electronic business mailing; and
receive, after the first user is authenticated, one or more second input commands to access a second electronic business mailing from an authenticated sender,
wherein the access portal is selected, from a plurality of access portals, to receive a third electronic business mailing including delivery address information and addressed to a second user, wherein the selection is based on a locality of a physical delivery address of the second user when a user postal system electronic delivery address, assigned to registered users, is not included in the delivery address information and the physical delivery address cannot be associated with a corresponding user postal system electronic delivery address.

2. The access portal of claim 1, wherein the processing logic is further configured to provide one or more print commands to a printer configured to print the third electronic business mailing.

3. The access portal of claim 1, wherein the processing logic is further configured to provide one or more data entry fields, to the first user, to create the first electronic business mailing.

4. The access portal of claim 1, wherein the first electronic business mailing is processed into one or more unique messages that are encoded for integrity checks prior to sending the one or more unique messages over the secure system of nodes to the destination access portal.

5. The access portal of claim 1, wherein the first electronic business mailing is processed into one or more unique messages storing content associated with the first electronic business mailing, and wherein the content is encrypted prior to sending the one or more unique messages over the secure system of nodes to the destination access portal.

6. The access portal of claim 1, wherein the first electronic business mailing is processed into one or more unique messages and each unique message is provided an identifier to ensure that each unique message is delivered only once to the destination access portal.

7. The access portal of claim 1, wherein a data manager is configured to store and manage the second electronic business mailing and content associated with the second electronic business mailing.

8. A method comprising:
receiving, at an access portal including processing logic, one or more authentication input commands;
utilizing, by the processing logic of the access portal, the one or more authentication input commands to authenticate a first user registered with a secure system of nodes;
receiving, at the access portal and after the first user is authenticated, one or more first input commands to create a first electronic business mailing;
sending, by the processing logic, the first electronic business mailing to the secure system of nodes such that the first electronic business mailing is sent over the secure system of nodes to a destination access portal associated with a recipient of the first electronic business mailing;
receiving, at the access portal and after the first user is authenticated, one or more second input commands to access a second electronic business mailing from an authenticated sender; and
receiving, at the access portal, a third electronic business mailing including delivery address information of a second user,
wherein the access portal is selected from a plurality of access portals to receive the third electronic business mailing based on a locality of a physical delivery address of the second user when a user postal system electronic delivery address, assigned to registered users, is not included in the delivery address information and the physical delivery address cannot be associated with a corresponding user postal system electronic delivery address.

9. The method of claim 8, further comprising providing one or more print commands to a printer configured to print the third electronic business mailing.

10. The method of claim 8, further comprising providing one or more data entry fields, to the first user, to create the first electronic business mailing.

11. The method of claim 8, further comprising processing the first electronic business mailing into one or more unique messages that are encoded for integrity checks prior to sending the one or more unique messages over the secure system of nodes to the destination access portal.

12. The method of claim 8, further comprising processing the first electronic business mailing into one or more unique messages storing content associated with the first electronic business mailing, and wherein the content is encrypted prior to sending the one or more unique messages over the secure system of nodes to the destination access portal.

13. The method of claim 8, further comprising processing the first electronic business mailing into one or more unique messages and each unique message is provided an identifier to ensure that each unique message is delivered only once to the destination access portal.

14. The method of claim 8, further comprising wherein a data manager stores and manages the second electronic business mailing and content associated with the second electronic business mailing.

15. An access portal of a secure system of nodes, the access portal comprising:
processing logic configured to:
receive one or more authentication input commands to authenticate a first user registered with the secure system of nodes;
receive, after the first user is authenticated, one or more input commands to create a first electronic business mailing or access a second electronic business mailing, wherein the first electronic business mailing is sent over the secure system of nodes to a destination access portal associated with a recipient after the first electronic business mailing is created utilizing the one or more input commands, or wherein the second electronic business mailing is received at the access portal and accessed after receiving the one or more input commands to access the second electronic business mailing that was transmitted over the secure system of nodes from a registered sender; and
receive a third electronic business mailing including delivery address information of a second user,
wherein access portal is selected from a plurality of access portals to receive the third electronic business mailing based on a locality of a physical delivery address of the second user when a user postal system electronic delivery address, assigned to registered users, is not included in the delivery address information and the physical delivery address cannot be associated with a corresponding user postal system electronic delivery address.

16. The access portal of claim 15, wherein the processing logic is further configured to provide one or more print commands to a printer configured to print the third electronic business mailing.

17. The access portal of claim 15, wherein the processing logic is further configured to provide one or more data entry fields, to the first user, to create the first electronic business mailing when the one or more input commands are received to create the first business mailing.

18. The access portal of claim 15, wherein the first electronic business mailing is processed into one or more unique messages that are encoded for integrity checks prior to sending the one or more unique messages over the secure system of nodes to the destination access portal.

19. The access portal of claim 15, wherein the first electronic business mailing is processed into one or more unique messages storing content associated with the first electronic business mailing, and wherein the content is encrypted prior to sending the one or more unique messages over the secure system of nodes to the destination access portal.

20. The access portal of claim 15, wherein the first electronic business mailing is processed into one or more unique messages and each unique message is provided an identifier to ensure that each unique message is delivered only once to the destination access portal.

* * * * *

UNITED STATES PATENT AND TRADEMARK OFFICE
CERTIFICATE OF CORRECTION

Page 1 of 1

PATENT NO. : 10,038,659 B2
APPLICATION NO. : 15/287310
DATED : July 31, 2018
INVENTOR(S) : Liam Church et al.

It is certified that error appears in the above-identified patent and that said Letters Patent is hereby corrected as shown below:

In the Specification

Column 1, Line 53, reads:
"paper record may be is placed into an envelope, addressed"
Should read:
--paper record may be placed into an envelope, addressed--

Signed and Sealed this
Twenty-sixth Day of November, 2019

Andrei Iancu
*Director of the United States Patent and Trademark Office*